United States Patent
Steinbichler et al.

(10) Patent No.: US 7,810,388 B2
(45) Date of Patent: Oct. 12, 2010

(54) TIRE TESTING FACILITY

(75) Inventors: Marcus Steinbichler, Neubeuern (DE); Rainer Huber, Piding (DE); Junil Sun, Raubling/Nicklheim (DE); Bernd Leitner, Neubeuern (DE)

(73) Assignee: Steinbichler Optotechnik GmbH (DE)

( * ) Notice: Subject to any disclaimer, the term of this patent is extended or adjusted under 35 U.S.C. 154(b) by 0 days.

(21) Appl. No.: 12/186,943

(22) Filed: Aug. 6, 2008

(65) Prior Publication Data

US 2009/0044615 A1  Feb. 19, 2009

(30) Foreign Application Priority Data

Aug. 13, 2007  (DE) .................. 10 2007 038 176

(51) Int. Cl.
*G01M 17/02* (2006.01)

(52) U.S. Cl. ........................................ 73/146

(58) Field of Classification Search .................. 73/146; 356/458
See application file for complete search history.

(56) References Cited

U.S. PATENT DOCUMENTS

| | | | | |
|---|---|---|---|---|
| 6,012,329 A | * | 1/2000 | Kelm-Klager et al. | 73/146 |
| 6,041,649 A | * | 3/2000 | Fembock | 73/146 |
| 6,988,397 B1 | * | 1/2006 | Delmoro et al. | 73/146 |
| 7,456,973 B2 | * | 11/2008 | Steinbichler et al. | 356/457 |
| 7,568,385 B2 | * | 8/2009 | Maehner et al. | 73/146 |
| 2005/0058333 A1 | | 3/2005 | Kaneko et al. | |
| 2005/0092075 A1 | * | 5/2005 | Saunders et al. | 73/146 |
| 2008/0108283 A1 | * | 5/2008 | Poling et al. | 451/258 |
| 2008/0158569 A1 | * | 7/2008 | Maehner et al. | 356/458 |
| 2008/0202229 A1 | * | 8/2008 | Maehner et al. | 73/146 |
| 2009/0044615 A1 | * | 2/2009 | Steinbichler et al. | 73/146 |

FOREIGN PATENT DOCUMENTS

| | | |
|---|---|---|
| DE | 4232201 | 3/1994 |
| DE | 68922855 | 11/1995 |
| DE | 10319099 | 11/2004 |
| DE | 102006015123 | 10/2007 |
| EP | 1043573 | 10/2000 |
| EP | 1284409 | 2/2003 |
| EP | 1355142 | 10/2003 |
| EP | 1500917 | 1/2005 |
| EP | 1808686 | 7/2007 |

* cited by examiner

*Primary Examiner*—Andre J Allen
(74) *Attorney, Agent, or Firm*—The Webb Law Firm

(57) ABSTRACT

A tire testing facility used for testing tires includes a tire testing device with one or more testing heads (5) for testing the inner running surface (8) of the tire (1) and one or more testing heads (6, 7) for testing the outer sidewall (3, 2) side wall of the tire (1).

16 Claims, 3 Drawing Sheets

Configuration 1

Test cycle A
3 measuring heads for:
half the running surface +
1st side wall at the same time tire is flipped Test cycle B
3 measuring heads for:
half the running surface +
2nd side wall at the same time

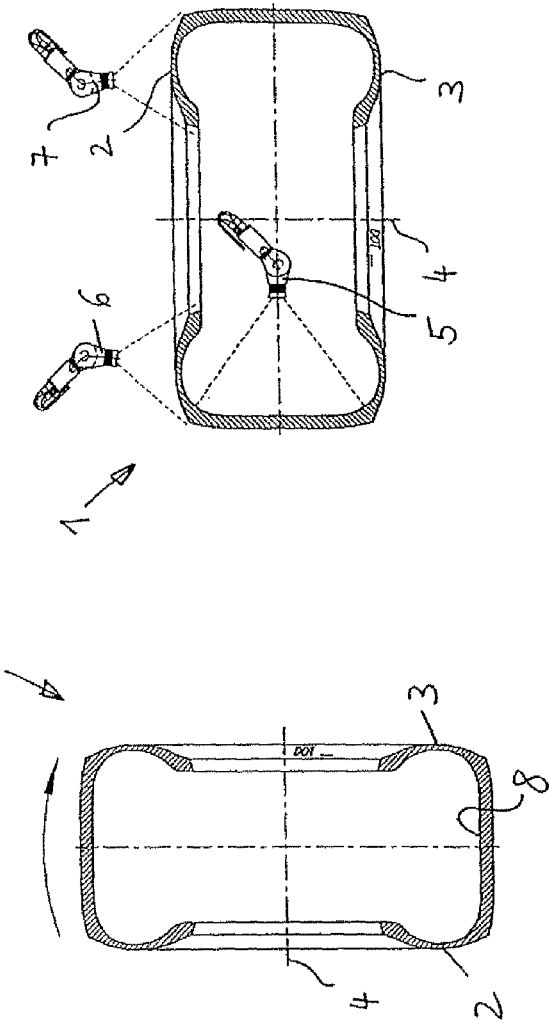
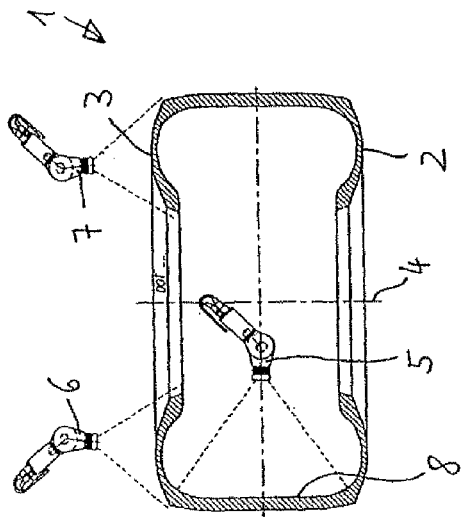

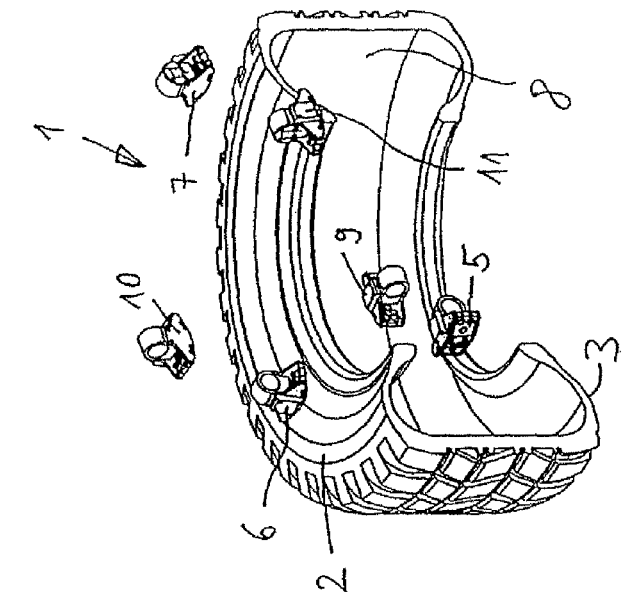
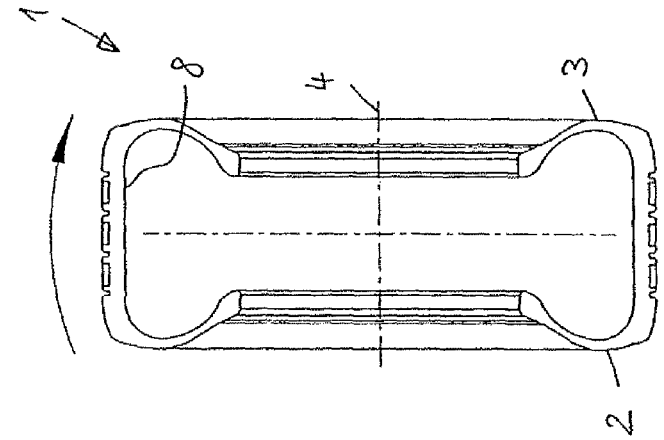
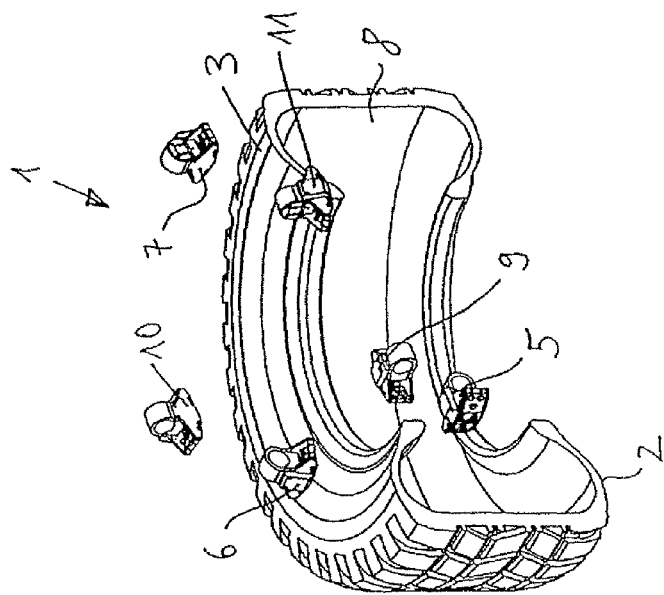

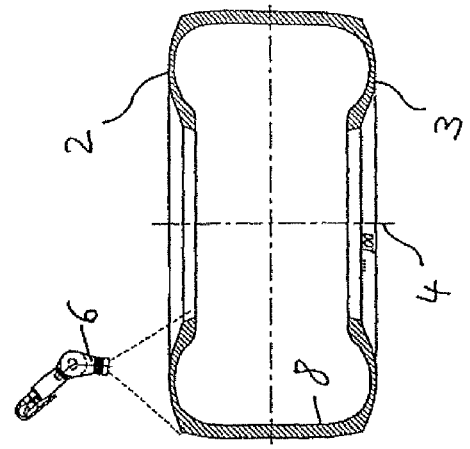
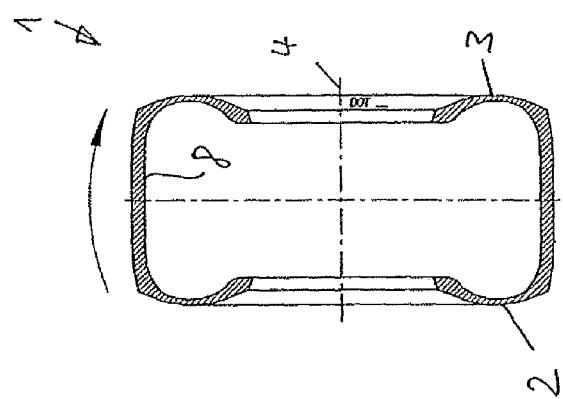
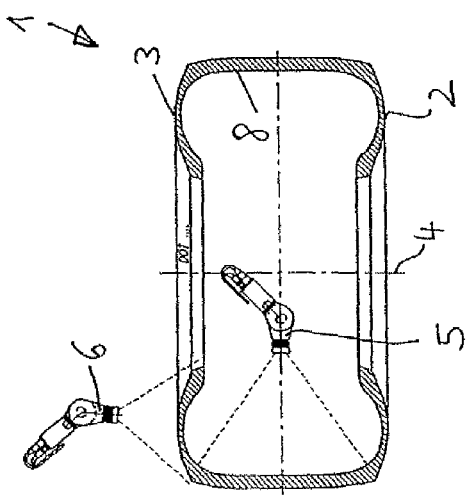
Fig. 3

TIRE TESTING FACILITY

CROSS REFERENCE TO RELATED APPLICATIONS

This application claims priority to German Patent Document No. 10 2007 038 176.1 dated Aug. 13, 2007.

BACKGROUND OF THE INVENTION

1. Field of the Invention

This invention relates to a tire testing facility for testing tires and a method for testing tires with such tire testing facility.

2. Description of Related Art

Methods for testing tires are known already. It is particularly advantageous to test the tires by interferometry. Interferometric testing is a relative testing method, in which the surface contour of the tire in two or more different conditions is compared with each other. Typically, the tire undergoes a load change between the individual conditions, which effects a significant change in the surface contour at defective points. The load change in particular is a change in the ambient pressure. By means of the change in the surface contour defects in the tire can be inferred.

Proceeding therefrom, care should be taken in the interferometric test that a change in contour which is not due to the load change is avoided. In the commonly used testing systems, this can for instance be achieved by a rather vibration-insensitive assembly, which prevents disturbances and changes in the position of the measuring head and/or the tire. Moreover, tensions and creeping movements in the tire can be suppressed by a stable support of the tire.

Excessive self-movements of the tire lead to great malfunctions in the final analysis up to an exceedance of the measurement range of the interferometric measurement. Therefore, rigid specimens are more suitable for interferometric tests than tires which are slow to respond to changes in force and slowly change their shape over a period of minutes even up to hours.

In commonly used interferometric testing devices, tires therefore are tested without rim and lying on a sidewall, in order to ensure a rather full-surface support and thus minimize vibrations and self-movements. In this position, at least one testing head tests the whole tire portion by portion, wherein the running surface can be tested from inside in individual sectors and bead and sidewall can be tested from outside.

From EP 1 043 578 A2, an optical testing device for tires is known, which comprises a plurality of laser measuring heads.

EP 1 284 409 A1 discloses an apparatus for examining tires with an interferometric measuring head and with a light-section contour detection system for generating light surfaces, which are oriented towards a camera such that the light sections generated on the tire can be observed with the camera.

From EP 1 355 142 A2, a tire testing device is known, which includes horizontal rollers on which the tire can be positioned in a vertical position.

In the prior art tire testing devices, the testing head is circumferentially moved relative to the tire, in order to successively test first the entire running surface and in a second cycle the first sidewall. Thereafter, the tire must be lifted and turned over, so as to be able to also test the second sidewall in a third cycle.

According to EP 1 355 142 A2, this disadvantage is overcome in that the tire is tested in the upright position, so that both sidewalls of the tire can be tested without the tire having to be turned over. For testing the tire, one portion each is tested. Thereafter, rotating the tire is continued, so as to be able to examine the whole tire in this way. For rotating the tire, rollers are provided, which support the tire on its running surface or in the rim hole. However, the tire each experiences non-uniform forces, which can lead to dents and whole-body deformations. Before the interferometric test, it must be waited for these disturbances to subside. After each rotation of the tire for testing the next portion, new force relations exist, which can in part lead to waiting times lasting several minutes.

Further tire testing devices are known from DE 103 19 099 B4, DE 689 22 855 T2, DE 10 2006 015 123 A1, DE 42 32 201 A1, EP 1 808 686 A1, EP 1 500 917 A2 and US 2005/0058333 A1.

SUMMARY OF THE INVENTION

It is the object of the invention to propose an improved tire testing facility as mentioned above and an improved method for testing tires with such tire testing facility.

In accordance with the invention, this object is solved in a tire testing facility for testing tires by the features of claim 1. The tire testing facility comprises a tire testing device with one or more testing heads for testing the inner running surface of the tire and one or more testing heads for testing the outer sidewall of the tire. The testing heads in particular are interferometric testing heads. Preferably, the testing heads comprise a source for directed light, in particular laser light, an interferometer and a camera. The camera preferably comprises an optical recording system and an image sensor, in particular a CCD sensor. The testing head preferably is pivotally mounted. It can be pivotally mounted about one or more axes. Instead or in addition, the testing head can be movable in one or more directions. Furthermore, the tire testing device preferably comprises a pressure chamber, in particular a vacuum chamber.

Advantageous developments are described in the subclaims.

Advantageously, the tire testing device includes a testing head for testing the inner running surface of the tire and two testing heads for testing the outer side face of the tire. The testing heads for testing the outer side face of the tire preferably are offset by 180°. In operation of this tire testing device, one half of the inner running surface and the entire outer sidewall of the tire initially is checked. Thereafter, the tire is turned over, and the remaining half of the inner running surface and the entire other side face of the tire is tested. As a result, the number of test cycles can be reduced from three to two.

Another advantageous development is characterized in that the tire testing device includes a plurality of testing heads for testing the inner running surface of the tire and twice as many testing heads for testing the outer side face of the tire. The testing heads for testing the inner running surface of the tire and the testing heads for testing the outer side face of the tire preferably are distributed around the circumference at equal angular distances. In operation of this tire testing device, half of the inner running surface of the tire and the entirety of an outer side face of the tire initially is tested. When for instance two testing heads are present for testing the inner running surface of the tire and four testing heads for testing the outer side face of the tire, the testing heads and/or the tire must be rotated by 90°, in order to perform this test. Thereafter, the tire is turned over, and the remaining half of the inner running surface of the tire and the entirety of the other outer side face of the tire is tested.

In accordance with another advantageous development, the tire testing device includes a testing head for testing the inner running surface of the tire and a testing head for testing the outer side face of the tire. In operation of this tire testing device, the entire inner running surface of the tire and the entirety of an outer side face is tested in one of the two cycles. Thereafter, the tire is turned over and the other side face of the tire is completely tested.

In this tire testing device, the number of test cycles also can be reduced from three to two.

Another advantageous development is characterized in that the testing device includes a plurality of testing heads for testing the inner running surface of the tire and just as many testing heads for testing the outer side face of the tire. Preferably, the testing heads for testing the inner running surface and the testing heads for testing the outer side face each are uniformly distributed about the circumference. When for instance two testing heads each are present, the testing heads and/or the tire each must only be rotated by 180°.

The tire testing facility can comprise a turning device for turning over the tire. The tire can, however, also be turned over manually.

Advantageously, the tire testing facility comprises a marking means for marking the tire before turning over the tire. In this way, it can be ensured that after turning over the tire, the same is correctly positioned in the tire testing device.

The tire testing facility can comprise a position detecting means for detecting the position of the tire before and/or after turning over the tire.

In accordance with another advantageous development, the tire testing facility comprises a positioning means for correctly positioning the tire after turning over the tire.

In a method for testing tires with a tire testing facility in accordance with the invention, the object underlying the invention is solved in that one or more or all testing heads test a part of the tire, that the tire is turned over, and that one or more or all testing heads test the remaining part of the tire.

Advantageously, the testing heads test the inner running surface and the outer side face of the tire. Preferably, only the inner running surface and the outer side face of the tire are tested.

Another advantageous development is characterized in that before or after turning over the tire an outer side face and one half of the inner running surface of the tire is tested, and that after or before turning over the tire the other outer side face and the other half of the inner running surface of the tire is tested. Preferably, only the inner running surface of the tire is tested.

In accordance with another advantageous development, before or after turning over the tire an outer side face and the inner running surface, preferably only the inner running surface, of the tire is tested, and after or before turning over the tire the other outer side face of the tire is tested.

The tire can be marked before being turned over.

It is possible that the position of the tire is detected before and/or after being turned over.

Advantageously, the tire is correctly positioned after being turned over.

BRIEF DESCRIPTION OF THE DRAWINGS

Embodiments of the intention will be explained in detail below with reference to the attached drawing, in which:

FIG. 1 shows a tire testing facility with a tire testing device with three testing heads and a turning device in a schematic representation, FIG. 2 shows a modification of the tire testing facility as shown in FIG. 1 with a tire testing device with six testing heads, and FIG. 3 shows a tire testing facility with a tire testing device with two testing heads and a turning device in a schematic representation.

DESCRIPTION OF THE PREFERRED EMBODIMENTS

In the tire testing device of the tire testing facility as shown in FIG. 1, the tire 1 lies flat on a support. The side face 2 lies on the horizontal support (not shown in the drawing). The other side face 3 lies at the top and is freely accessible. The middle axis 4 of the tire extends vertically. The tire 1 is not mounted on a rim.

The first testing head 5 is moved into the interior of the tire 1. For this purpose, the testing head 5 is vertically movable. In addition, it can also be horizontally movable. Furthermore, the testing head can be pivotally mounted about a horizontal axis.

The second testing head 6 and the third testing head 7 are positioned above the tire, namely such that they can test the upper side face 3 of the tire 1. The testing heads 6 and 7 are offset by 180° in circumferential direction. They are located opposite each other.

The tire 1 and the testing heads 5, 6, 7 can be disposed in a pressure chamber, in particular a vacuum chamber, of the tire testing device. In the first test cycle, the tire 1 is rotated by 180° about the vertical axis 4. Instead or in addition, the testing heads 5, 6, 7 can be rotated, in order to achieve a relative rotation of the tire 1 with respect to the testing heads 5, 6, 7. In this way, half of the inner running surface 8 and the entire side face 3 are tested in the first test cycle.

Thereafter, the tire is turned over ("flipped"), so that the side face 2, which so far was lying on the support, now lies at the top and the tire rests on the support with the tested side face 3. For turning over the tire 1, the testing head 5 can first be moved out of the tire 1. For turning over, the tire 1 can be removed from the tire testing device and then again be placed in the tire testing device. This can be done manually or by a turning device. Before turning over, a mark can be applied on the tire 1, in order to ensure that the tire is correctly positioned in the tire testing device after being turned over. For this purpose, a position detecting means for detecting the position of the tire 1 before and/or after turning over the tire 1 can be present in the tire testing device. Furthermore, a positioning means for correctly positioning the tire after turning over the tire can be present in the tire testing device.

In the second test cycle, the tire is again rotated by 180° and/or the testing heads 5, 6, 7 are rotated, so that there is a relative rotation of the tire 1 by 180° with respect to the testing heads 5, 6, 7. The angle of rotation can be slightly greater than 180°, in order to generate a certain overlap region. By means of the marking means and/or the position detecting means and/or the positioning means it is ensured that both halves of the inner surface, in particular of the inner running surface, of the tire are tested.

In the modification as shown in FIG. 2, two testing heads 5, 9 are provided for the inner surface of the tire and four testing heads 6, 7, 10, 11 for the side face of the tire. The testing heads 5, 9 and the testing heads 6, 7, 10, 11 each are offset by 90° in circumferential direction. In the embodiment as shown in FIG. 2, a relative rotation of 90° or slightly more than 90° between the tire and the testing heads is sufficient for completely testing the tire.

FIG. 3 shows an embodiment with two testing heads. The first testing head serves to test the inner surface, in particular the inner running surface 8, of the tire 1. The second testing head serves to test a side face of the tire 1.

In a test cycle shown on the left in FIG. 3, the entire inner surface 8 of the tire 1 and the entire side face 3 are tested. In another test cycle, which is shown on the right in FIG. 3, the other side face 2 of the tire is tested. In both test cycles, the tire is each rotated by 360° relative to the testing heads.

By means of the invention, it is possible to reduce the number of test cycles from three to two. In the embodiments as shown in FIGS. 1 and 2, three testing heads or an integer multiple of three testing heads are used, wherein two testing heads or two thirds of the testing heads test the entire first sidewall from outside, whereas the third testing head or the third of the testing heads tests half of the inner surface or inner running surface. After turning over the tire, the second sidewall and the second half of the inner surface of the tire is tested in the same way in a second test cycle.

The tire can be rotated relative to the testing heads. The testing heads can, however, also be rotated separately or together in the circumference of the tire. Furthermore, both possibilities can be combined with each other.

In the embodiment as shown in FIG. 3, an arrangement with two testing heads or an integer multiple of two testing heads is used, wherein one testing head or half of the testing heads is used for testing the sidewall and one testing head or the other half of the testing heads is used for testing the inner surface of the tire. The tire is tested in two cycles. In one of the two cycles, the inner surface and the first side wall are tested, and in the other cycle only the second side wall is tested. As compared to the embodiments of FIGS. 1 and 2, this takes a bit more time, but requires fewer testing heads.

The invention claimed is:

1. A tire testing facility for testing tires, comprising:
   a tire testing device with one or more testing heads for testing an inner running surface of the tire; and
   one or more testing heads for testing an outer side face of the tire.

2. The tire testing facility according to claim 1, wherein the tire testing device includes a testing head for testing the inner running surface of the tire and two testing heads for testing the outer side face of the tire.

3. The tire testing facility according to claim 1, wherein the tire testing device includes a plurality of testing heads for testing the inner running surface of the tire and twice as many testing heads for testing the outer side face of the tire.

4. The tire testing facility according to claim 1, wherein the tire testing device includes a testing head for testing the inner running surface of the tire and a testing head for testing the outer side face of the tire.

5. The tire testing facility according to claim 1, wherein the tire testing device includes a plurality of testing heads for testing the inner running surface of the tire and just as many testing heads for testing the outer side face of the tire.

6. The tire testing facility according to claim 1, further comprising a turning device for turning over the tire.

7. The tire testing facility according to claim 1, further comprising a marking means for marking the tire before turning over the tire.

8. The tire testing facility according to claim 1, further comprising a position detecting means for detecting the position of the tire before and/or after turning over the tire.

9. The tire testing facility according to claim 1, further comprising a positioning means for correctly positioning the tire after turning over the tire.

10. A method for testing tires with a tire testing facility, comprising:
    providing one or more testing heads;
    testing a part of the tire;
    turning the tire over; and
    wherein one or more or all testing heads test the remaining part of the tire.

11. The method according claim 10, wherein the testing heads test an inner running surface and an outer side face of the tire.

12. The method according to claim 10, wherein before or after turning over the tire, an outer side face and one half of an inner running surface of the tire is tested, and wherein after or before turning over the tire the other outer side face and the other half of the inner running surface of the tire is tested.

13. The method according to claim 10, wherein before or after turning over the tire, an outer side face and an inner running surface of the tire is tested, and wherein after or before turning over the tire the other outer side face of the tire is tested.

14. The method according to claim 10, wherein the tire is marked before being turned over.

15. The method according to claim 10, wherein the position of the tire is detected before and/or after being turned over.

16. The method according to claim 10, wherein the tire is correctly positioned after being turned over.

* * * * *

UNITED STATES PATENT AND TRADEMARK OFFICE
CERTIFICATE OF CORRECTION

| | |
|---|---|
| PATENT NO. | : 7,810,388 B2 |
| APPLICATION NO. | : 12/186943 |
| DATED | : October 12, 2010 |
| INVENTOR(S) | : Steinbichler et al. |

It is certified that error appears in the above-identified patent and that said Letters Patent is hereby corrected as shown below:

Column 6, line 24, Claim 10, "providing one or more testing heads;" should read:
-- providing one or more testing heads for testing an outer side face of the tire and one or more testing heads for testing an inner running surface of the tire; --

Signed and Sealed this
Eighth Day of February, 2011

David J. Kappos
*Director of the United States Patent and Trademark Office*